(12) United States Patent
Oshima et al.

(10) Patent No.: US 6,601,269 B2
(45) Date of Patent: Aug. 5, 2003

(54) HINGE ASSEMBLY

(75) Inventors: Kazuyoshi Oshima, Naruto-machi (JP); Kenji Tomizawa, Shibayama-machi (JP)

(73) Assignee: Sugatsune Kogyo Co., Ltd. (JP)

( * ) Notice: Subject to any disclaimer, the term of this patent is extended or adjusted under 35 U.S.C. 154(b) by 0 days.

(21) Appl. No.: 09/980,553

(22) PCT Filed: Mar. 12, 2001

(86) PCT No.: PCT/JP01/01924

§ 371 (c)(1),
(2), (4) Date: Nov. 15, 2001

(87) PCT Pub. No.: WO01/71138

PCT Pub. Date: Dec. 3, 2001

(65) Prior Publication Data

US 2002/0133907 A1 Sep. 26, 2002

(30) Foreign Application Priority Data

Mar. 22, 2000 (JP) ........................................ 2000-079855
Mar. 22, 2000 (JP) ........................................ 2000-079856

(51) Int. Cl.⁷ ............................. E05D 11/08; E05F 1/14
(52) U.S. Cl. ............................. 16/342; 16/285; 16/307
(58) Field of Search ........................ 16/342, 280, 285, 16/306, 243, 248, 307, 297; 379/433.13; 403/119, 120

(56) References Cited

U.S. PATENT DOCUMENTS

| 5,037,231 | A | * | 8/1991 | Kitamura | ................... | 403/120 |
|---|---|---|---|---|---|---|
| 5,142,738 | A | * | 9/1992 | Ojima | ......................... | 16/306 |
| 5,231,734 | A | * | 8/1993 | Rude | ............................ | 16/342 |
| 5,566,048 | A | * | 10/1996 | Esterberg et al. | ........... | 361/681 |
| 5,749,124 | A | * | 5/1998 | Lu | ............................. | 16/307 |
| 5,771,539 | A | * | 6/1998 | Wahlstedt et al. | ............ | 16/285 |
| 5,894,633 | A | * | 4/1999 | Kaneko | ...................... | 16/306 |
| 6,321,415 | B1 | * | 11/2001 | Frohlund | ..................... | 16/330 |
| 6,347,433 | B1 | * | 2/2002 | Novin et al. | .................. | 16/367 |

FOREIGN PATENT DOCUMENTS

| JP | 58-110163 | 6/1893 |
|---|---|---|
| JP | 58-110163 | 7/1983 |
| JP | 02-101274 | 4/1990 |
| JP | 03-95484 | 9/1991 |
| JP | 04-327402 | 11/1992 |

* cited by examiner

Primary Examiner—Anthony Knight
Assistant Examiner—Doug Hutton
(74) Attorney, Agent, or Firm—Eugene Stephens & Associates

(57) ABSTRACT

A shaft part (3A) of a second hinge member (3) is press-fitted into a support hole (23) of a first hinge member (2). By this, frictional resistance is generated between an inner peripheral surface of the support hole (23) and an outer peripheral surface of the shaft part (3A). A coiled spring (4) is disposed between the first hinge member (2) and the second hinge member (3). The coiled spring (4) biases the first and second hinge members (2, 3) such that when the first and second hinge members (2, 3) are turned in normal and reverse directions from a predetermined neutral position, the first and second hinge members (2, 3) are returned towards the neutral position side.

7 Claims, 13 Drawing Sheets (A)

(B) (C)

(A)

(B)

(C)

(A)

(B)

(C)

HINGE ASSEMBLY

TECHNICAL FIELD

This invention relates to a hinge assembly suited to be used for turnably connecting two articles together such as a keyboard and a liquid crystal display of a notebook-type personal computer.

BACKGROUND ART

In general, a hinge assembly used for a notebook-type personal computer includes one pair of hinge members which are fixed to a keyboard and a display, respectively. One hinge member has a support hole and the other has a shaft part. The shaft part is turnably inserted into the support hole, thereby turnably connecting the pair of hinge members together and therefore, turnably connecting the keyboard and the display together. The shaft part is press-fitted into the support hole. By this, a frictional resistance is generated between the outer peripheral surface of the shaft part and the inner peripheral surface of the support hole. The frictional resistance thus generated makes it possible to maintain the display in an optional turning position.

The frictional resistance between the shaft part and the support hole is set to a comparatively large value in order to stop the display in an optional position overcoming the turning force caused by the dead weight of the display. However, if the frictional resistance is increased, there occurs a problem in that it becomes difficult to turn the display because the display must be turned with a force large enough to cope with the frictional resistance. Moreover, if the frictional resistance is large, there occurs another problem in that the keyboard tends to turn together with the display when the folded display is opened. In order to turn only the display, it is necessary to keep pressing the keyboard. This makes it practically impossible for the user to open the display with one hand.

DISCLOSURE OF INVENTION

It is a first object of the present invention to provide a hinge assembly through which two articles such as a keyboard and a display of a personal computer can be turned lightly.

In order to achieve the first object, a first form of the present invention provides a hinge assembly comprising a first hinge member having a support hole, a second hinge member having a shaft part and turnably connected to the first hinge member by the shaft part being turnably inserted into the support hole, and biasing means disposed between the first hinge member and the second hinge member, the shaft part being press-fitted into the support hole so that frictional resistance is generated between an outer peripheral surface of the shaft part and an inner peripheral surface of the support hole, the biasing means biasing the first and second hinge members towards a neutral position side when the first and second hinge members are turned in normal and reverse directions from the neutral position.

In this first form, it is preferred that a receiving hole is formed in the shaft part such that the receiving hole extends from a front end face of the shaft part towards the inside, and the biasing means is received in the receiving hole. It is also preferred that a coiled spring is used as the biasing means. It is also preferred that the first hinge member is formed with a first and a second engagement portions, and the second hinge member is formed with a third and a fourth engagement portions, so that when the first and second hinge members are turned in one direction from the neutral position, the first and fourth engagement portions are engaged, respectively, with a first and a second end part of the coiled spring to twist the coiled spring in accordance with turning motion of the first and second hinge members and the second and third engagement portions are brought away, respectively, from the second and first end parts of the coiled spring, and when the first and second hinge members are turned in the other direction from the neutral position, the first and fourth engagement portions are brought away, respectively, from the first and second end parts of the coiled spring and the second and third engagement portions are engaged, respectively, with the second and first end parts of the coiled spring to twist the coiled spring in accordance with turning motion of the first and second hinge members.

In order to achieve the above object, a second form of the present invention provides a hinge assembly in which one (first article) of two articles is turnably connected with a lower end part of the other article (second article) about a generally horizontal rotation axis such that the second article can turn normally and reversely downward from an upright position where the second article are erected vertically, the hinge assembly comprising a pair of first and second hinge members fixed to the first and second articles, respectively, the first hinge member being formed with a support hole whose axis is aligned with the rotation axis and the second hinge member being formed with a shaft part which can turnably be inserted into the support hole, the shaft part being press-fitted into the support hole so that frictional resistance is generated between an outer peripheral surface of the shaft part and an inner peripheral surface of the support hole, biasing means being disposed between the pair of first and second hinge members, the biasing means being adapted to bias the second article, which has been turned downward from the upright position, towards the upright position side through a hinge member fixed to the second article, a following relation being established among various turning forces acting on the second article, $$|Fs-Fg|<Ff$$

where Fg represents a force caused by a dead weight of the second article, Fs, a force caused by a biasing force from the biasing means and Ff, a turning force corresponding to the frictional resistance, respectively.

In this second form of the present invention, it is preferred that a receiving hole is formed in the shaft part such that the receiving hole extends from a front end face of the shaft part towards the inside, and the biasing means is received in the receiving hole. It is also preferred that a coiled spring is used as the biasing means. It is also preferred that the first hinge member is formed with a first and a second engagement portions, and the second hinge member is formed with a third and a fourth engagement portions, so that when the second article is turned in one direction from the upright position, the first and fourth engagement portions are engaged, respectively, with a first and a second end part of the coiled spring to twist the coiled spring in accordance with turning motion of the second article and the second and third engagement portions are brought away, respectively, from the second and first end parts of the coiled spring, and when the second article is turned in the other direction from the upright position, the first and fourth engagement portions are brought away, respectively, from the first and second end parts of the coiled spring and the second and third engagement portions are engaged, respectively, with the second and first end parts of the coiled spring to twist the coiled spring in accordance with turning motion of the second article.

A second object of the present invention is to provide a hinge assembly, in which in the case where a pair of hinge members are biased by a coiled spring, the coiled spring is twisted in the same direction irrespective of the turning direction of the pair of hinge members.

In order to achieve the second object, a third form of the present invention provides a hinge assembly comprising a pair of hinge members turnably connected together for turning in normal and reverse directions from a neutral position and a coiled spring for biasing the pair of hinge members, which have been turned in normal and reverse directions from the neutral position, towards the neutral position side, the first hinge member of the pair of hinge members being formed with a first and a second engagement portion and the second hinge member being formed with a third and a fourth engagement portion, so that when the pair of hinge members are turned in one direction from the neutral position, the first and fourth engagement portions are engaged, respectively, with a first and a second end part of the coiled spring to twist the coiled spring in accordance with turning motion of the pair of hinge members and the second and third engagement portions are brought away, respectively, from the second and first end parts of the coiled spring, and when the pair of hinge members are turned in the other direction from the neutral position, the first and fourth engagement portions are brought away, respectively, from the first and second end parts of the coiled spring and the second and third engagement portions are engaged, respectively, with the second and first end parts of the coiled spring to twist the coiled spring in accordance with turning motion of the pair of hinge members.

In this third form, it is preferred that the coiled spring is twisted in a winding direction. It is also preferred that the first hinge member is formed with a support hole extending on a rotation axis thereof, the second hinge member is formed with a shaft part turnably inserted into the support hole, the shaft part is formed with a receiving hole extending from a front end face of the shaft part towards the inside, and the coiled spring is received in the receiving hole. In this case, it is preferred that the support hole is in the form of a through-hole whose opposite ends are open, the shaft part is inserted all the way through the support hole, opposite end parts of the coiled spring are projected outward from the opposite end parts of the support hole and also projected from an outer peripheral surface of the shaft part, the first and second engagement portions are formed on opposite end faces of the first hinge member which is formed with the support hole whose opposite end parts are open, and the opposite end parts of the shaft part projecting from the support hole is formed with the third and fourth engagement portions, respectively.

BRIEF DESCRIPTION OF DRAWINGS

FIG. 1(A) is a front sectional view in a section containing an axis of a support hole of a first hinge member, and FIGS. 1(B) and 1(C) are sectional views taken on line B—B and line C—C of FIG. 1(A), respectively;

FIG. 2(A) is a front view thereof, FIG. 2(B) is a plan view thereof, FIGS. 2(C) and 2(E) are views when viewed in a direction as indicated by arrows C and E of FIG. 2(A), respectively, and FIG. 2(D) is a sectional view taken on line D—D of FIG. 2(A);

FIG. 4(A) is a side view thereof, and FIGS. 4(B) and 4(C) are views like FIGS. 2(C) and 2(E), respectively;

FIG. 5(A) is a side view thereof, and FIGS. 5(B) and 5(C) are views like FIGS. 2(C) and 2(E), respectively;

FIG. 6(A) is a side view thereof, and FIGS. 6(B) and 6(C) are views like FIGS. 2(C) and 2(E), respectively;

FIG. 10(A) is a front view thereof, FIG. 10B is a plan view thereof, and FIGS. 10(C) and 10(D) are views when viewed in directions as indicated by arrows C and D of FIG. 10(A), respectively;

FIG. 12(A) is a front view thereof, FIG, 12(B) is a plan view thereof, and FIGS. 12(C) and 12(D) are views when viewed in directions as indicated by arrows C and D of FIG, 12(A), respectively;

BEST MODE FOR CARRYING OUT THE INVENTION

Several embodiments of the present invention will be described hereinafter with reference to FIGS. 1 to 14.

Figure 4:
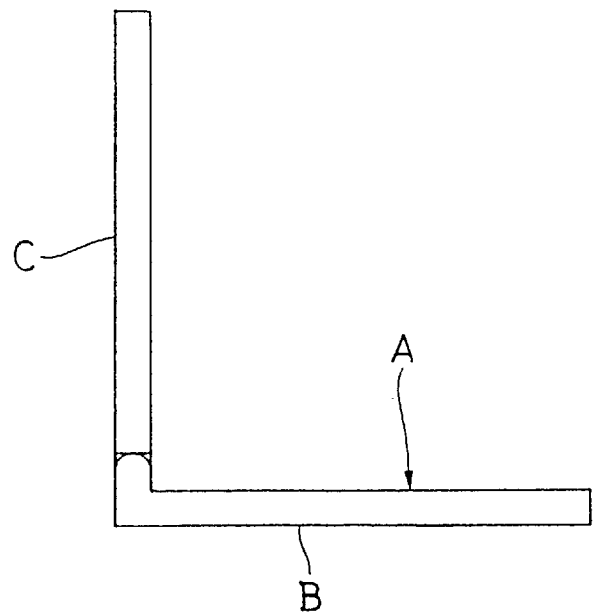
FIG. 4 is an illustration showing a notebook-type personal computer incorporated with the hinge assembly of the present invention in which a display thereof is turned to an upright position.
Figure 4:
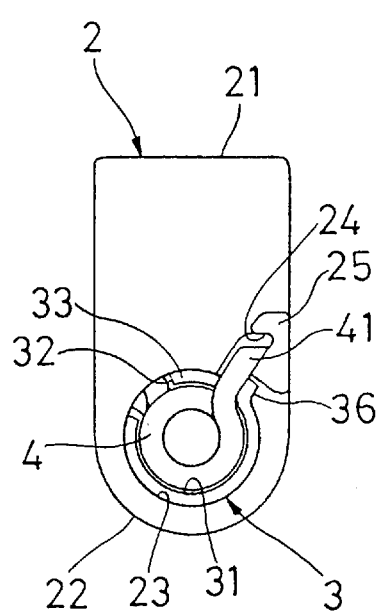
Figure 4:
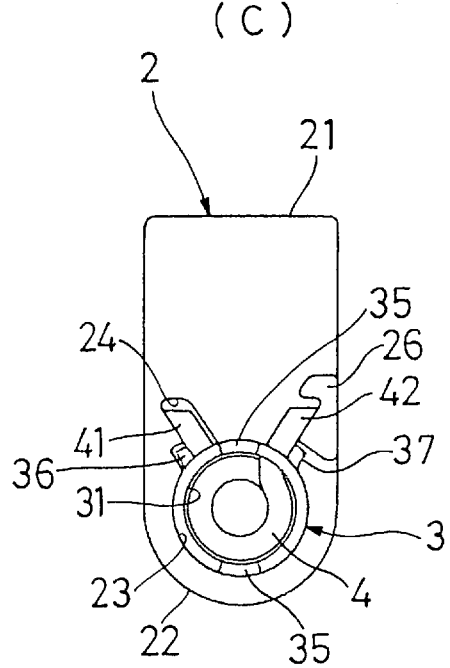
Figure 5:
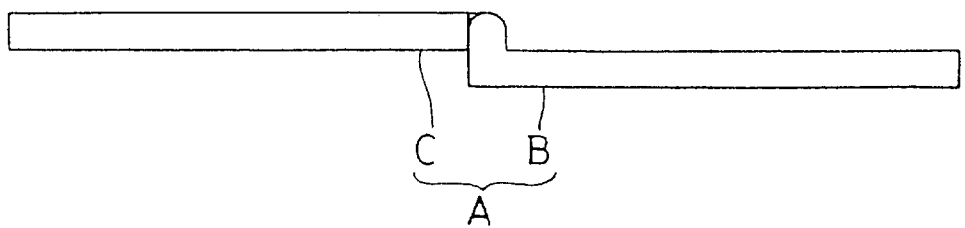
FIG. 5 is an illustration showing a state in which the display of the personal computer is turned to an open position.
Figure 5:
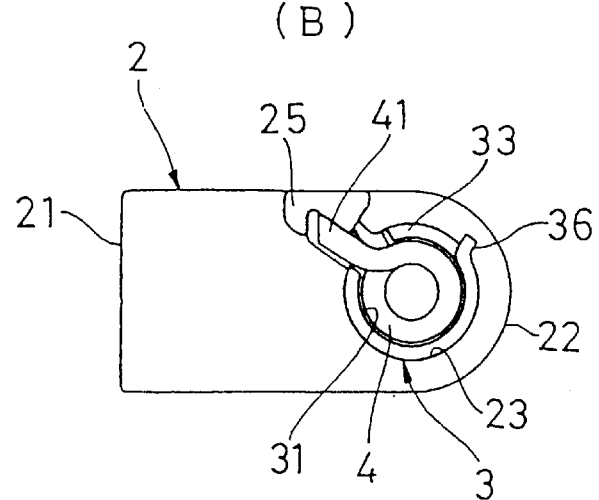
Figure 5:
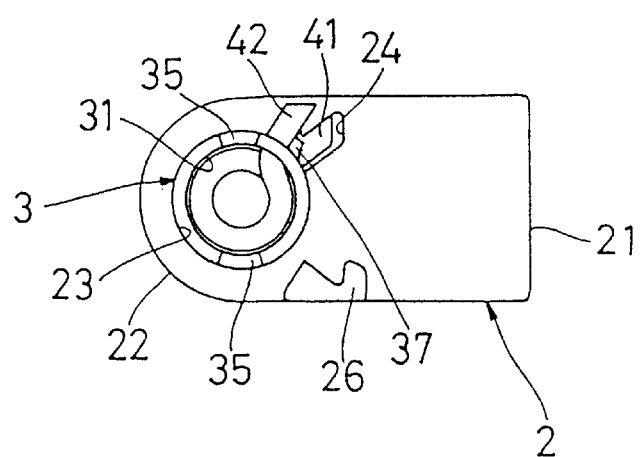
Figure 6:
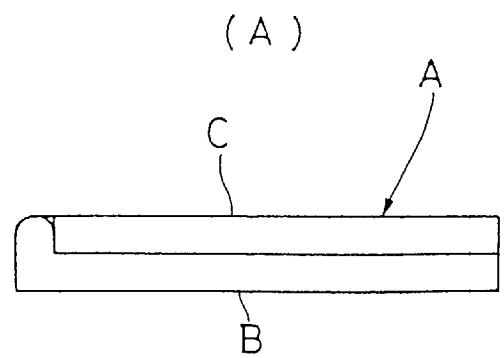
FIG. 6 is an illustration showing a state in which the display of the personal computer is turned to a folded position.
Figure 6:
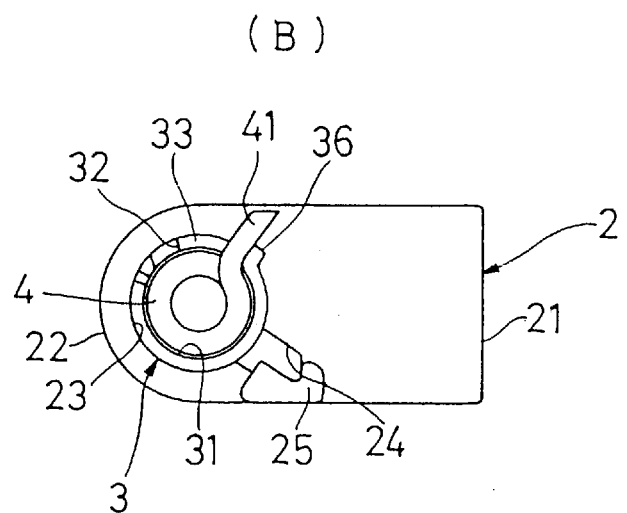
Figure 6:
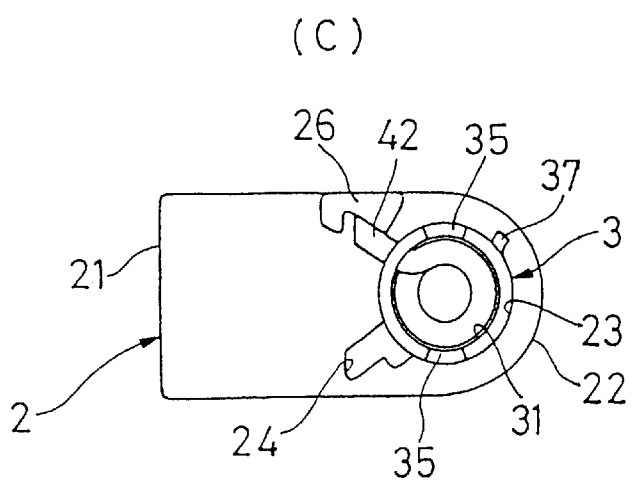
Figure 7:
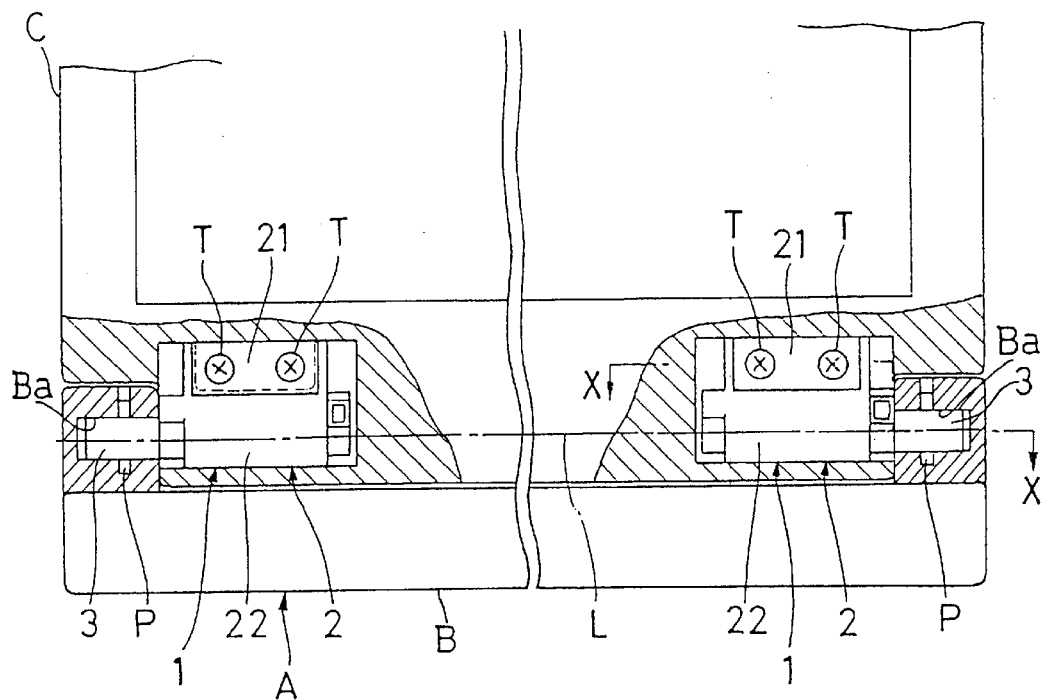
FIG. 7 is a partly omitted and partly cut-away front view, showing a state in which the display of the personal computer is turned to an upright position.
Figure 8:
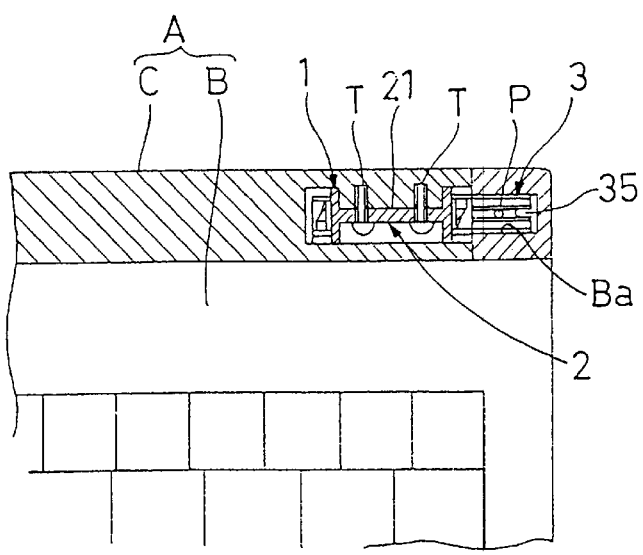
FIG. 8 is a sectional view taken on line X—X of FIG. 7.

First, a first embodiment will be described with reference to FIGS. 1 to 8, in which the present invention is applied to a hinge assembly used for a notebook-type personal computer. As shown in FIGS. 7 and 8, a notebook-type personal computer A comprises a keyboard (one of the two articles [first article]) B and a display (the other article [second article])C. Left and right opposite end parts of a lower side of the display C are turnably connected to left and right opposite end parts of a front side of the keyboard B through hinge assemblies 1, 1 for turning about a horizontal rotation axis L. The display C can be turned by approximately 90 degrees in both normal and reverse directions from an upright position (neutral position) of FIG. 4 where the display C is erected vertically with respect to the keyboard B. When the display C is turned approximately 90 degrees in one direction (hereinafter referred to as the "open direction") from the upright position, it arrives at a fully open position as shown in FIG. 5, and when the display C is turned approximately 90 degrees in the other direction (hereinafter referred to as the "close direction") from the upright position, it arrives at a folded position as shown in FIG. 6 where the display C is abutted with the keyboard B.

As shown in FIGS. 1 to 3 and FIGS. 7 and 8, the hinge assembly 1 comprises a first hinge member (one of the two hinge members) 2 fixed to the display C, a second hinge member (the other hinge member) 3 fixed to the keyboard B, and a coiled spring (biasing means) disposed between the first hinge member 2 and the second hinge member 3. The first and second hinge members 2, 3 are turned relatively in accordance with turning motion of the display C. In this embodiment, however, the keyboard is maintained in its generally horizontal posture and the display C is turned with reference to the keyboard B. Therefore, description is made hereinafter presuming that the first hinge member 2 is turned with reference to the second hinge member 3.

The first hinge member 2 includes an attachment part 21 and a connecting part 22. The attachment part 21 is fixed to the display C by a screw T. A support hole 23 is formed in the connecting part 22 in such a manner as to penetrate all the way therethrough. The support hole 23 has an axis aligned with a rotation axis L.

The second hinge member 3 is in the form of a shaft having a circular configuration in section. In this embodiment, since a receiving hole 31 is formed on the axis of the second hinge member 3 in such a manner as to extend from one end face to the other end face of the second hinge member 3, the second hinge member 3 is substantially in the form of a sleeve. A split groove 32 is formed in a peripheral wall part of the second hinge member 3. This split groove 32 extends from one end face to the other end face of the second hinge member 3. The split groove 32 is longer than the support hole 23. One end part (first end part) of the second hinge member 3 where the split groove 32 if formed serves as a shaft part 3A. The other end part (second end part) of the hinge member 3 serves as a fixed part 3B.

Since the split groove 32 is formed in the shaft part 3A, the shaft part 3A can be elastically enlarged/reduced in diameter. In the state in which the shaft part 3A is elastically reduced in diameter, the shaft part 3A is turnably inserted in the support hole 23. That is to say, the shaft part 3A is turnably press-fitted into the support hole 23. Accordingly, the second hinge member 3 can turn with respect to the first hinge member 2. However, a frictional resistance is generated between the outer peripheral surface of the shaft part 3A and the inner peripheral surface of the support hole 23. This frictional resistance serves to restrict a relative rotation between the first hinge member 2 and the second hinge member 3.

The shaft part 3A penetrates the support hole 23 all the way therethrough. Opposite end parts of the shaft part 3A projecting outward from the support hole 23 are formed with cutouts 33, 34, respectively. The cutouts 33, 34 extend in the same circumferential direction from the split groove 32. The lengths of the cutouts 33, 34 in the circumferential direction are set to equal which is slightly longer than 90 degrees.

The fixed part 3B is press-fitted in a fixed hole Ba of the keyboard B. By this, play is prevented from being formed between the keyboard B and the second hinge member 3. Fixed grooves 35, 35 extending from the second end face to the first end side of the second hinge member 3 are formed in the peripheral wall part of the fixed part 3B. The fixed grooves 35, 35 are arranged such that they are away 180 degrees from each other in the circumferential direction. A spring pin P whose opposite end parts are inserted in the keyboard B is inserted into each fixed groove 35. By this, the second hinge member 3 is non-turnably fixed to the keyboard B. And when the shaft part 3A of the hinge member 3 is turnably inserted into the support hole 23 of the first hinge member 2, the first and second hinge members 2, 3 are turnably connected together and therefore, the keyboard B and the display C are turnably connected together as previously mentioned. The outside diameter of the spring pin P is set to be slightly larger than the width of the fixed groove 35 and the spring pin P is inserted in the fixed groove 35 in a state in which the spring pin P is reduced in diameter. Accordingly, the outer peripheral surface of the spring pin P is normally press contacted with the opposite side surfaces of the fixed groove 35. By this, play is prevented from being formed in a circumferential direction about the rotation axis L between the keyboard B and the second hinge member 3. Hence, play is prevented from being formed in the circumferential direction about the rotation axis L between the keyboard B and the display C.

The coiled spring 4 is received in the receiving hole 31. By this, the hinge assembly 1 can totally be miniaturized compared with a case where, for example, the coiled spring 4 is arranged in a row with the hinge member 3. The outside diameter of the coiled spring 4 is slightly smaller than that of the receiving hole 31 so that the coiled spring 4 is turnably received in the receiving hole 31. The entire length of the coiled spring 4 is approximately equal to that of the shaft part 3A and the opposite end parts of the coiled spring 4 are projected outward from the support hole 23.

Opposite end parts of a wiring rod which constitutes the coiled spring 4 are bent in such a manner as to be directed outward from the outer periphery of the coiled spring 4 and terminated in abutment parts 41, 42, respectively. The respective abutment parts 41, 42 are passed through the cutout parts 33, 34, respectively and projected outward from the outer periphery of the shaft part 3A. Accordingly, at the time for receiving the coiled spring 4 in the receiving hole 31, the coiled spring 4 can be inserted into the receiving hole 31 from one end part (left end part of FIG. 1) of the receiving hole 31 by inserting the abutment part 42 into the split groove 32. The second hinge member 3 with the coiled spring 4 received therein can be inserted into the support hole 23 together with the coiled spring 4 by inserting the abutment member 42 into a through-groove 24 which is formed in the inner peripheral surface of the support hole 23 such a manner as to vertically cross the inner peripheral surface of the support hole 23.

When the display C is turned to the upright position, the coiled spring 4 is held in a natural state where no external force is applied thereto and therefore, the coiled spring 4 cannot bias the display C so as to cause the display C to turn. However, when the display C is turned in either the open or close direction from the upright position, the coiled spring 4 is twisted by the first and second hinge members 2, 3 to bias the display C towards the upright position side. Moreover, the coiled spring 4 is twisted in the winding direction irrespective of the turning direction of the display C from the upright position, such that the coiled spring 4 is reduced in diameter.

Figure 1:
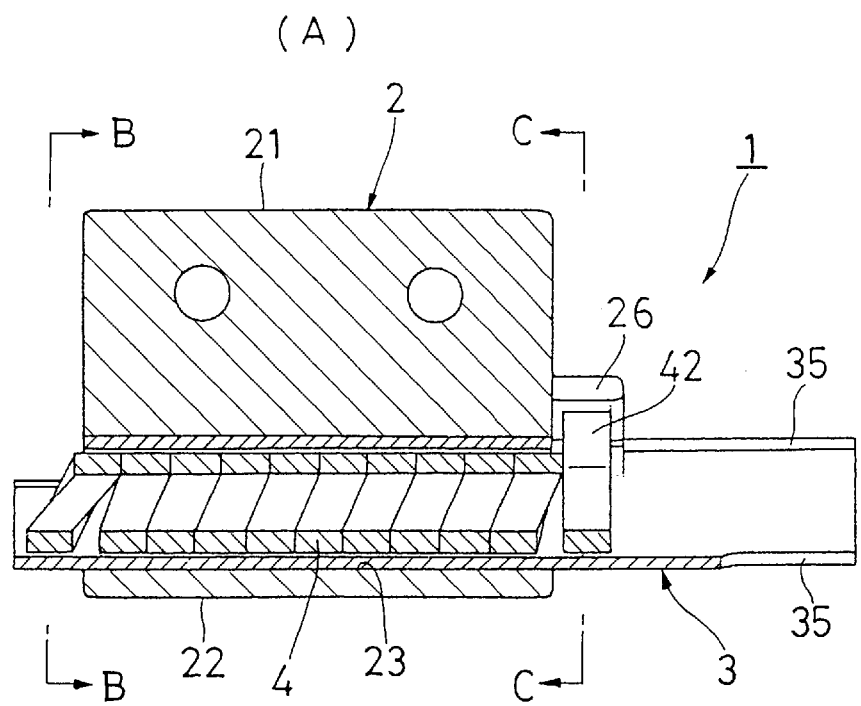
FIG. 1 is an illustration showing a first embodiment of the present invention.
Figure 1:
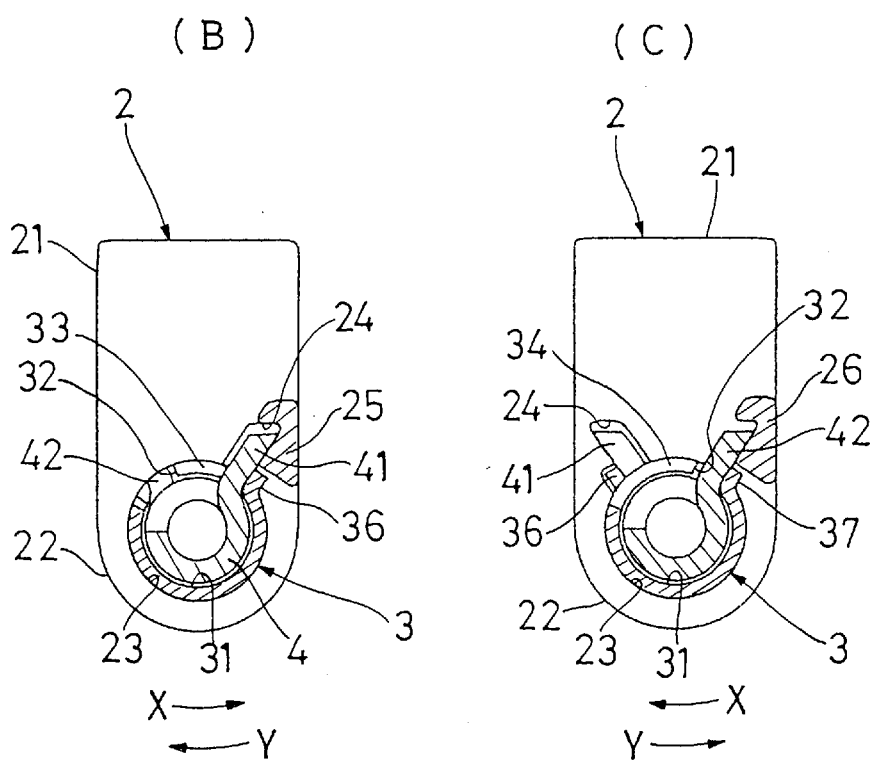
Figure 2:
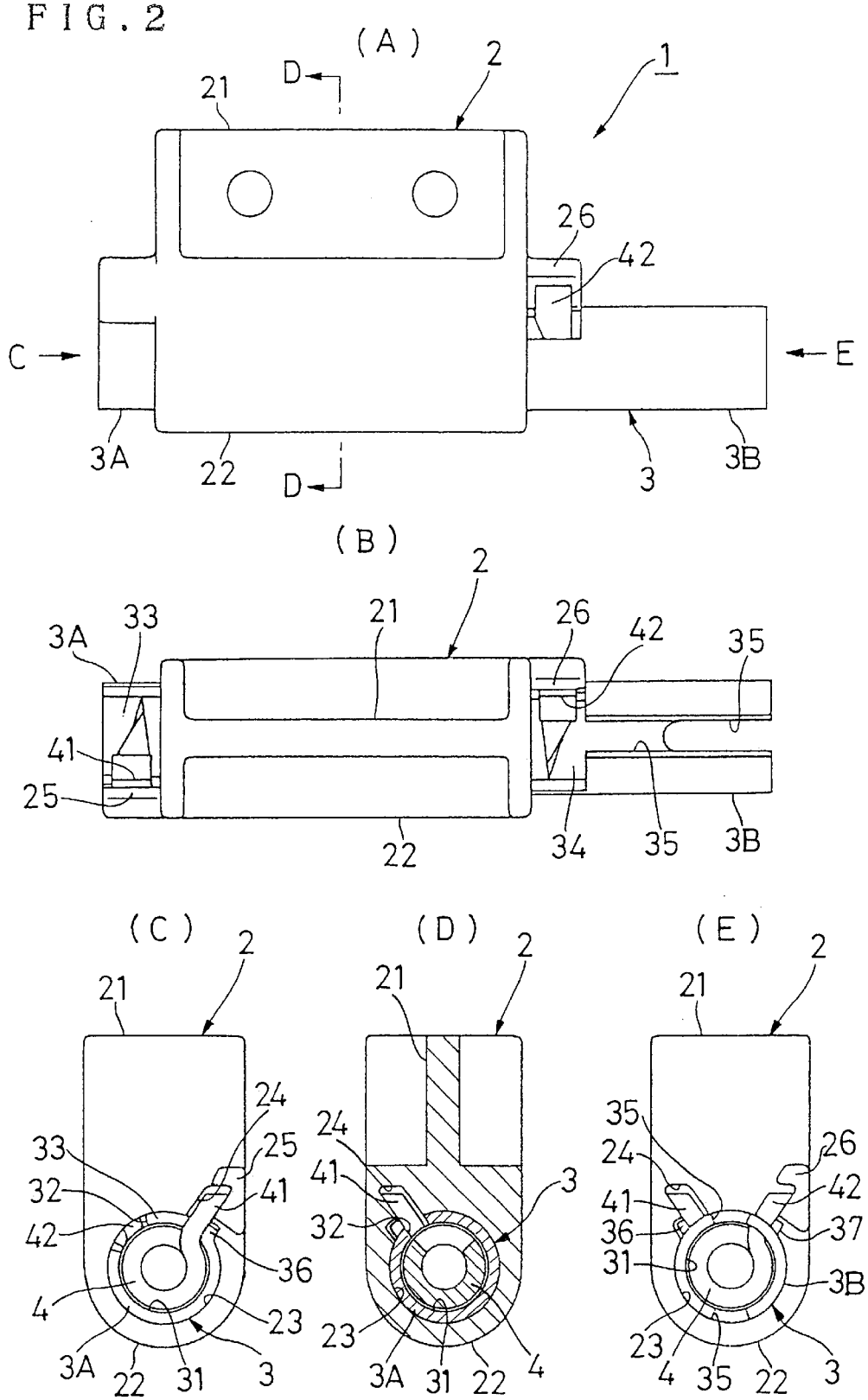
FIG. 2 is an illustration likewise showing the first embodiment.
Figure 3:
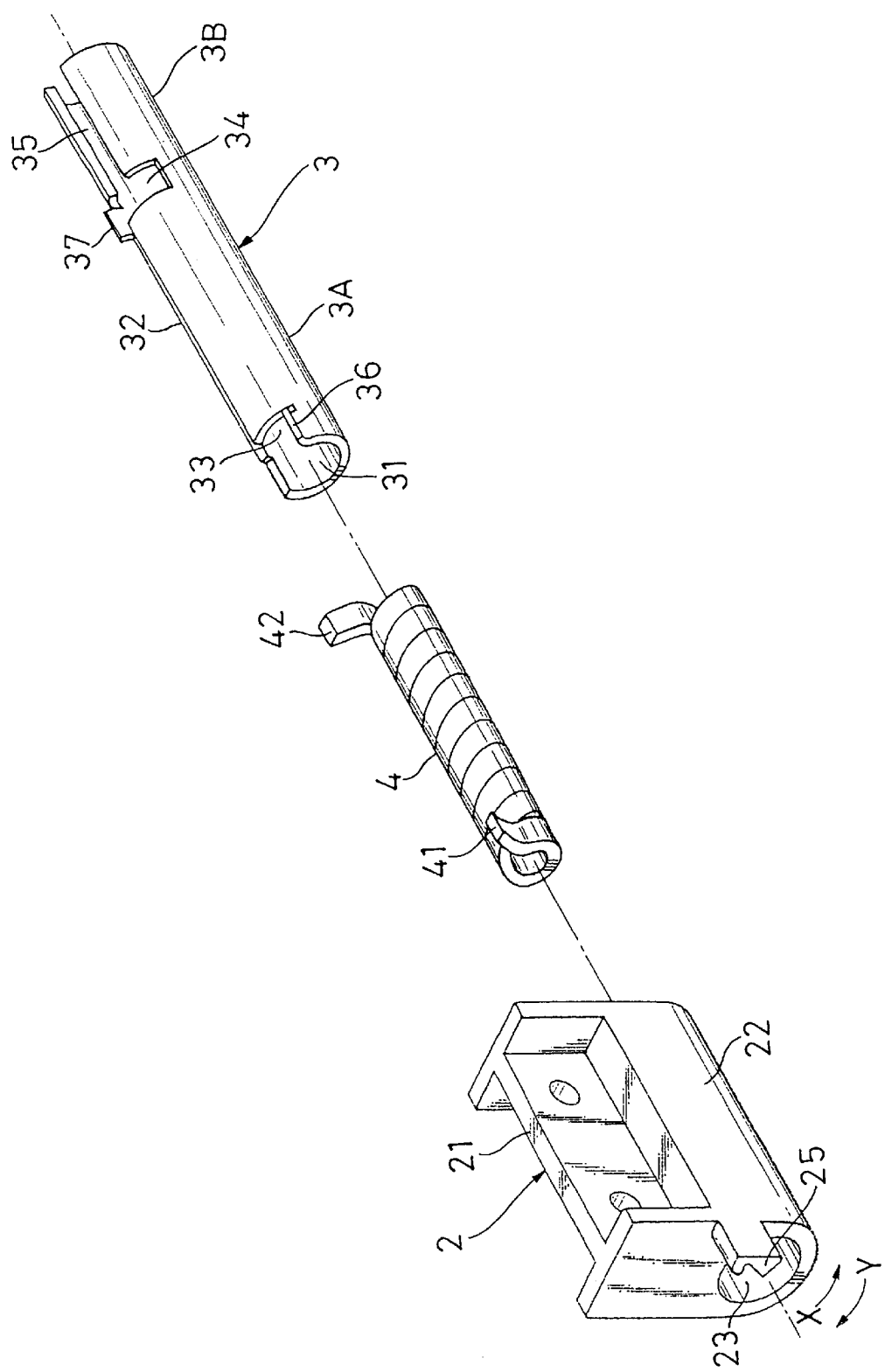
FIG. 3 is an exploded perspective view of the first embodiment.

That is to say, as shown in FIGS. 1 to 3, one end face (end face away the fixed part 3B) of the connecting part 22 of the first hinge member 2 is formed with the first engagement portion 25 and the other end face of the connecting part 22 is formed with the second engagement portion 26. When the display C is located in the upright position, the first and second engagement portions 25, 26 are generally contacted with the abutment parts 41, 42, respectively. However, when the display C is turned in the open direction (direction as indicated by the arrow X of FIGS. 1(B), 1(C), and 3 from the upright position, the first engagement portion 25 is brought into abutment with the abutment part 41 so as to press move the abutment part 41 in the direction as indicated by the arrow X. In contrast, when the display C is turned in the close direction (direction as indicated by the arrow Y) from the neutral position, it is brought away in the direction as indicated by the arrow Y from the abutment part 41. On the other hand, when the display C is turned in the direction as indicated by the arrow X from the upright position, the second engagement portion 26 is brought away in the direction as indicated by the arrow X from the abutment part 42 and when the display C is turned in the direction as indicated by the arrow Y from the upright position, it is brought into abutment with the abutment part 42 so as to press move the abutment part 42 in the direction Y.

The lengths of the cutout parts 33, 34 in the circumferential direction are set to allow the movements of the abutment members 41, 42 when the abutment members 41, 42 are moved in the circumference direction in accordance with the turning motion of the display C in the open and close direction from the upright position of the display C.

The shaft part 3A of the second hinge member 3 is formed with third and fourth engagement portions 36, 37. The third engagement portion 36 is formed at a side part (i.e., a side part facing the direction as indicated by the arrow X) opposing the split groove 32 in the peripheral wall part of the shaft part 3A facing the cutout part 33. The fourth engagement portion 37 is formed at a side part (i.e., a side part facing the direction as indicated by the arrow Y) on the side of the split groove 32 in the peripheral wall part of the shaft part 3A facing the cutout part 34. When the display C is located in the upright position, the third and fourth engagement portions 36, 37 are generally contacted with the abutment parts 41, 42 as in the case of the first and second engagement portions 25, 26. Accordingly, when the display C is located in the upright position, as shown in FIG. 4, the engagement parts 25, 26, 36, 37 are all generally contacted with the abutment parts 41, 42 and the coiled spring 4 is held in the natural state where the coiled spring 4 is not twisted. Thus, the coiled spring 4 does not bias the display C.

However, when the display C is turned in the direction as indicated by the arrow X from the upright position, as shown in FIG. 5, the abutment part 41 is press moved, by the first engagement portion 25, in the direction as indicated by the arrow X and the abutment part 42 tries to move in the direction as indicated by the arrow X following the movement of the abutment part 41. As a result, the third engagement portion 36 is brought away in the direction as indicated by the arrow Y relative to the abutment part 41, while the fourth engagement portion 37 is abutted with the abutment part 42 so as to be prevented from moving in the direction as indicated by the arrow X. Accordingly, when the display C is turned in the direction as indicated by the arrow X from the upright position, the coiled spring 4 is twisted by the first and fourth engagement portions 25, 37. In the case of this embodiment, the twisting direction of the coiled spring 4 is the same as the winding direction of the coiled spring 4.

In contrast, when the display C is turned in the direction as indicated by the arrow Y from the upright position, the abutment part 42 is press moved in the direction as indicated by the arrow Y by the second engagement portion 26 and the abutment part 41 tries to move in the direction as indicated by the arrow Y following the movement of the abutment part 42. As a result, the fourth engagement portion 37 is brought away in the direction as indicated by the arrow X relative to the abutment part 42, while the third engagement portion 36 is abutted with the abutment part 41 so as to be prevented from moving in the direction as indicated by the arrow Y. Accordingly, when the display C is turned in the direction as indicated by the arrow Y from the upright position, the coiled spring 4 is twisted by the second and third engagement portions 26, 36. In the case of this embodiment, the twisting direction of the coiled spring 4 is the same as the winding direction of the coiled spring 4.

In this way, since the coiled spring 4 is twisted when the display C is turned from the upright position, the coiled spring 4 biases the display C to return towards the upright position side. Here, various forces are set so that the following relation can be established, $$|Fs-Fg|<Ff \tag{1}$$

where Fs represents a force exerted to the display C caused by a biasing force of the coiled spring, Fg, a turning force exerted to the display C caused by a dead weight of the display C, and Ff, a turning force corresponding to a static frictional resistance acting between the inner peripheral surface of the support hole 23 and the outer peripheral surface of the shaft part A, respectively. Accordingly, the display C can be stopped at an optional position between the folded position and the open position.

In the hinge assembly 1 having the above-mentioned construction, when the display C is turned towards the folded position side or open position side, the coiled spring 4 biases the display C towards the upright position side so as to offset the turning force caused by the dead weight of the display C. Accordingly, even if the frictional resistance between the inner peripheral surface of the support hole 23 and the outer peripheral surface of the shaft part 3A is reduced, the display C can be stopped in an optional position. Moreover, in this embodiment, the turning force caused by the dead weight of the display C is increased as the display C is brought closer to the folded position or open position but the biasing force of the coiled spring 4 is also increased as the display C is brought closer to the folded position or open position. Accordingly, the difference between the turning force caused by the dead weight of the display C and the turning force caused by the biasing force is varied in accordance with the turning motion of the display C, but the amount of variation can be reduced. As a result, the frictional resistance between the inner peripheral surface of the support hole 3 and the outer peripheral surface of the shaft part 3A can further be reduced. Thus, the display C can be lightly turned so as to be opened/closed with a reduced force. Accordingly, it can surely be prevented that when the display C is turned from the folded position towards the upright position side, the keyboard B is turned together with the display C.

Even in the case where the display C is turned towards either the folded position side or open position side from the upright position, the coiled spring 4 is twisted in the same direction (in the winding direction in the case of this embodiment) and therefore, the amount of variation of the coiled spring 4 can be reduced. Accordingly, the coiled spring 4 can be prevented from being broken due to fatigue, thus enabling to prolong the service life of the hinge assembly 1. Should the coiled spring be twisted in the different direction when the display C is turned in normal and reverse directions from the upright position, the coiled spring would more likely be broken due to fatigue because the amount of variation of the coiled spring becomes twice as large as that of the case where the coiled spring is twisted in the same direction.

Next, another embodiment of the present invention will be described. In the embodiment(s) to be described hereinafter, only those constructions which are different from the first embodiment will be described and like parts are denoted by like reference numeral and description thereof is omitted.

Figure 9:
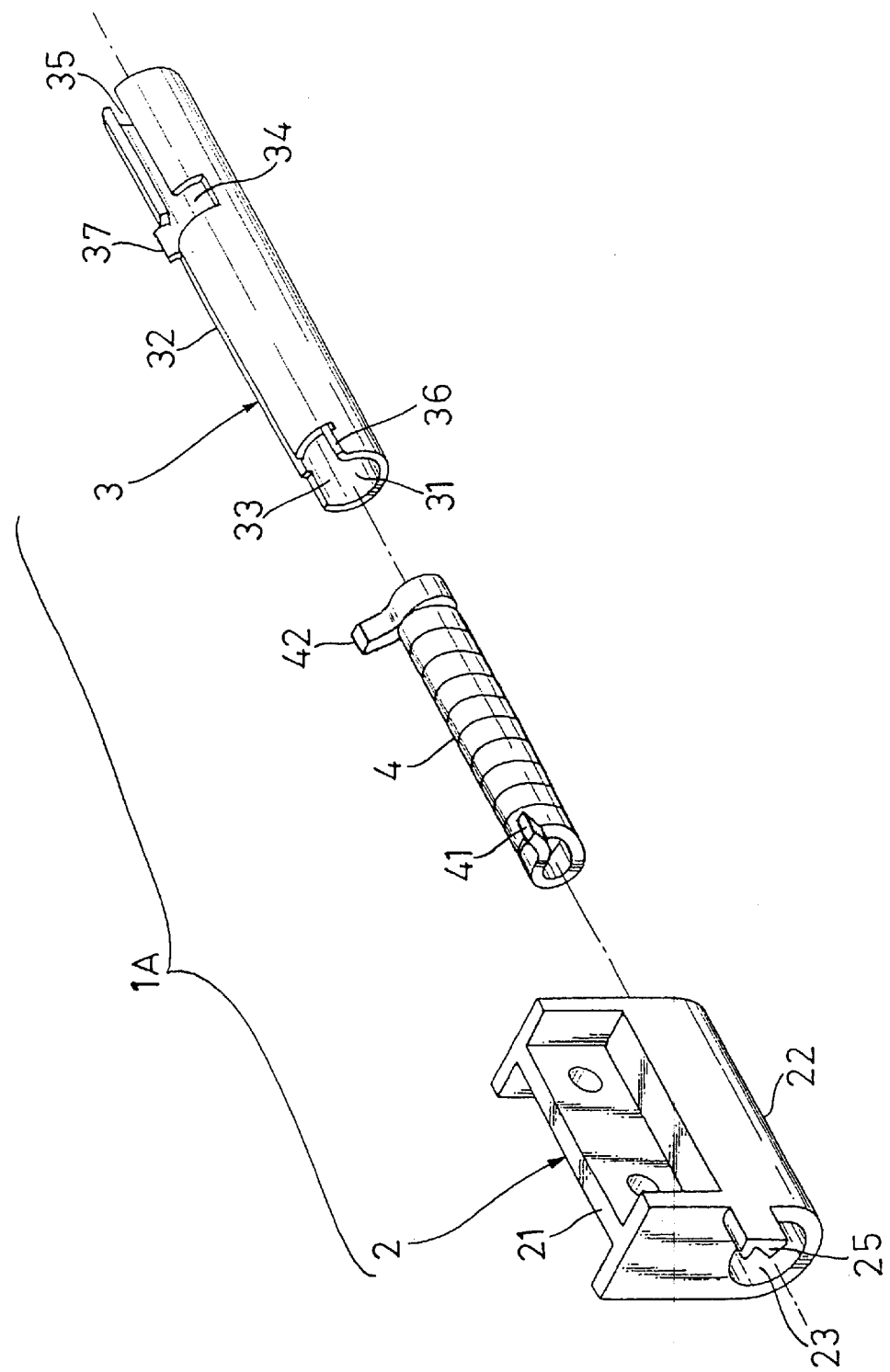
FIG. 9 is an exploded perspective view showing a second embodiment of the present invention.

FIG. 9 is an exploded perspective view showing a second embodiment of the present invention. In a hinge assembly 1A of this embodiment, the winding direction of the coiled spring 4 is reversed to the winding direction of the coiled spring 4 of the above embodiment. Accordingly, in this hinge assembly 1A, even if the display C is turned in either the open or close direction from the upright position, the coiled spring 4 is twisted in the reversed direction to the case of the above embodiment, namely, in the rewinding direction.

Figure 10:
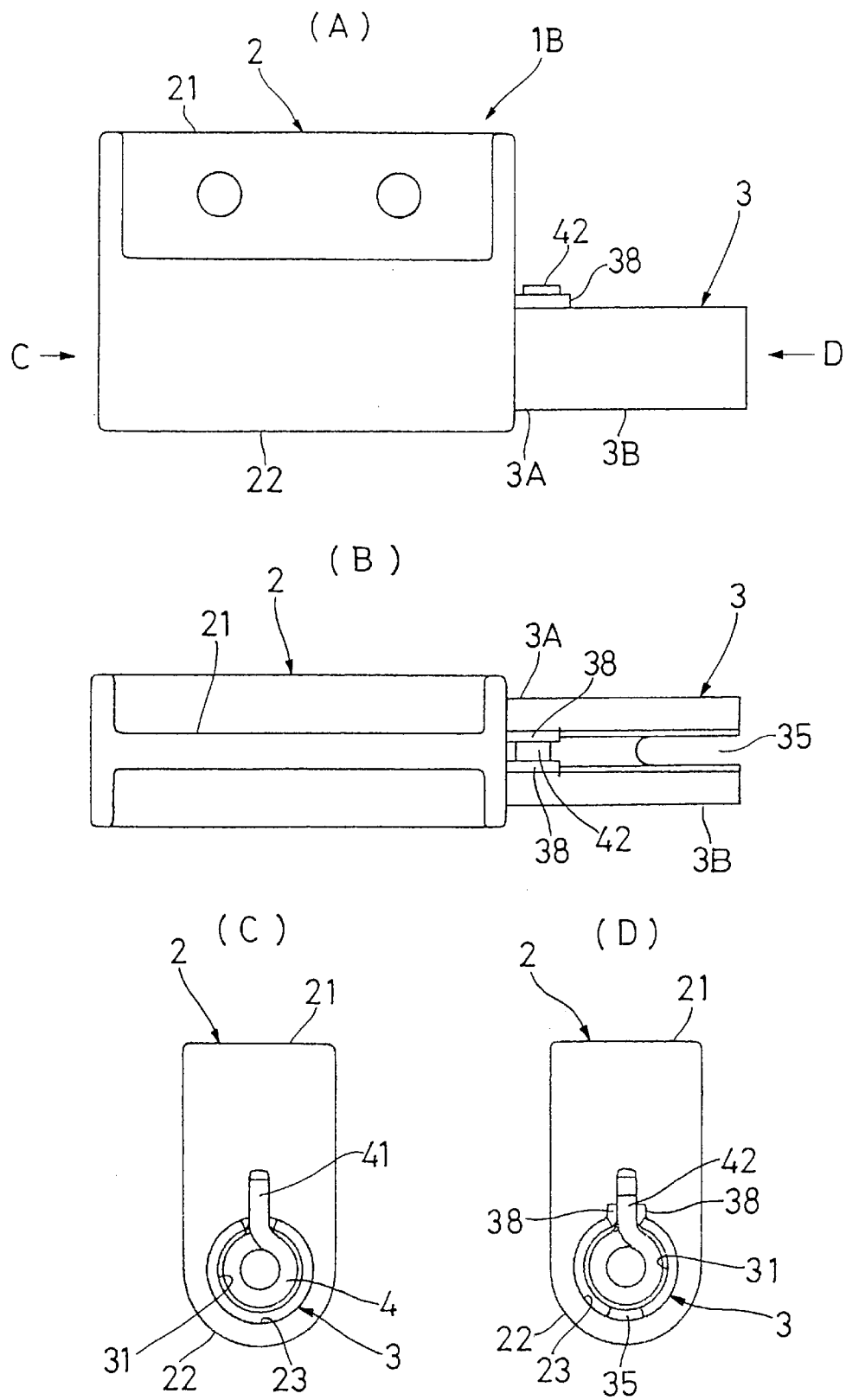
FIG. 10 is an illustration showing a third embodiment of the present invention.
Figure 11:
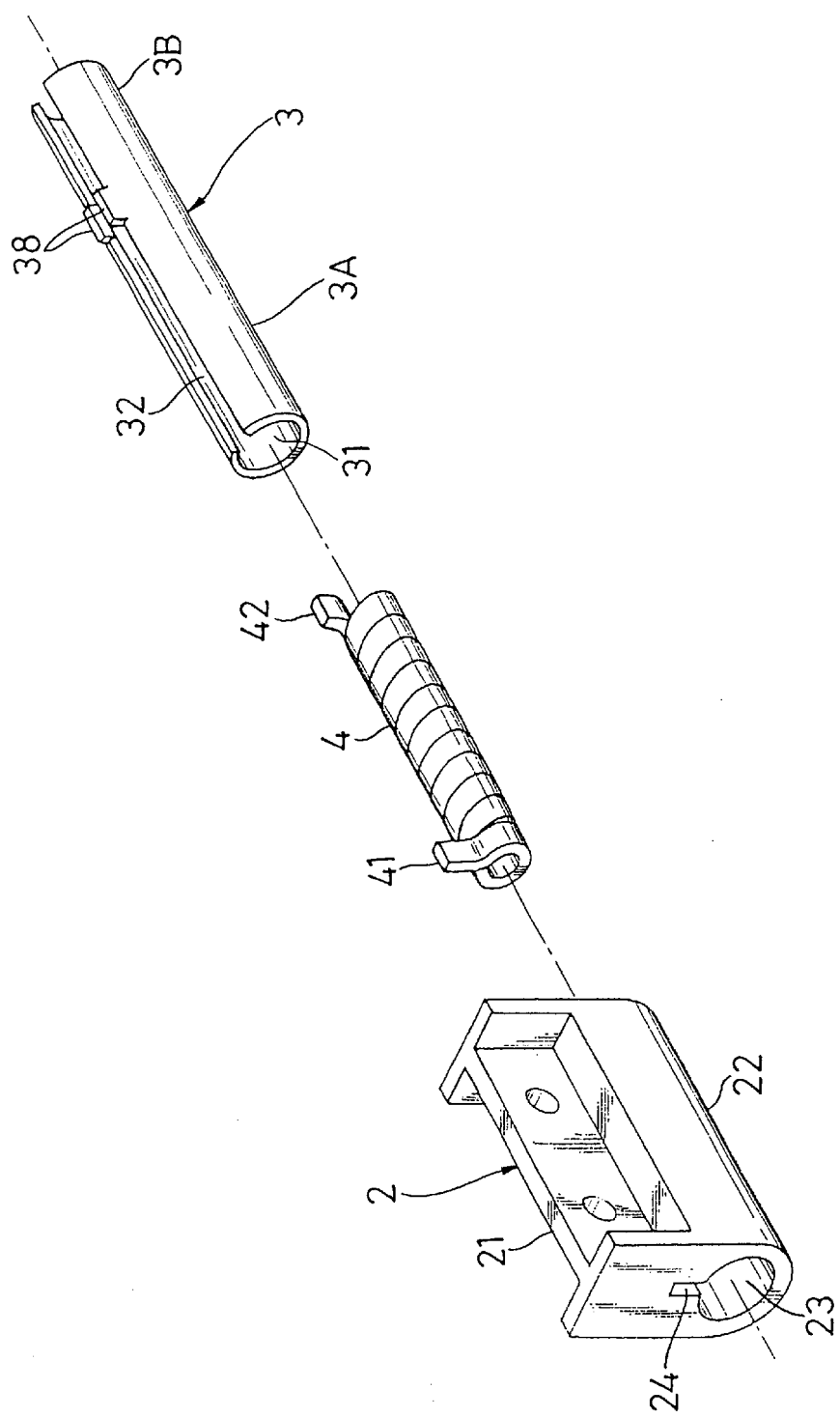
FIG. 11 is an exploded perspective view of the third embodiment.

FIGS. 10 and 11 show a third embodiment of the present invention. In a hinge assembly 1B of this embodiment, the first to fourth engagement portions 25, 26, 36, 37 are not employed. The first abutment part 41 of the coiled spring 4 inserted in the through-groove 24 of the first hinge member 2 such that the abutment part 41 cannot move in the circumferential direction about the rotation axis L. Moreover, the abutment part 41 is projected outside towards the axis from the receiving hole 31 of the second hinge member 3. Accordingly, the abutment part 41 can be turningly displaced with respect to the second hinge member 3. The second abutment part 42 is positioned by one pair of projection pieces 38, 38 formed on opposite side surfaces of the split groove 32 such that the second abutment part 42 cannot turningly displaced in the circumferential direction about the rotation axis L. Accordingly, in this embodiment, the coiled spring 4 is twisted in the winding direction when the display C is turned towards the open position side from the upright position, and the coiled spring 4 is twisted in the rewinding direction when the display C is turned from the upright position towards the folded position side.

It should be noted that in this embodiment, one of the two fixed grooves 35, 35 is aligned with the split groove 32 and communicated with the split groove 32.

Figure 12:
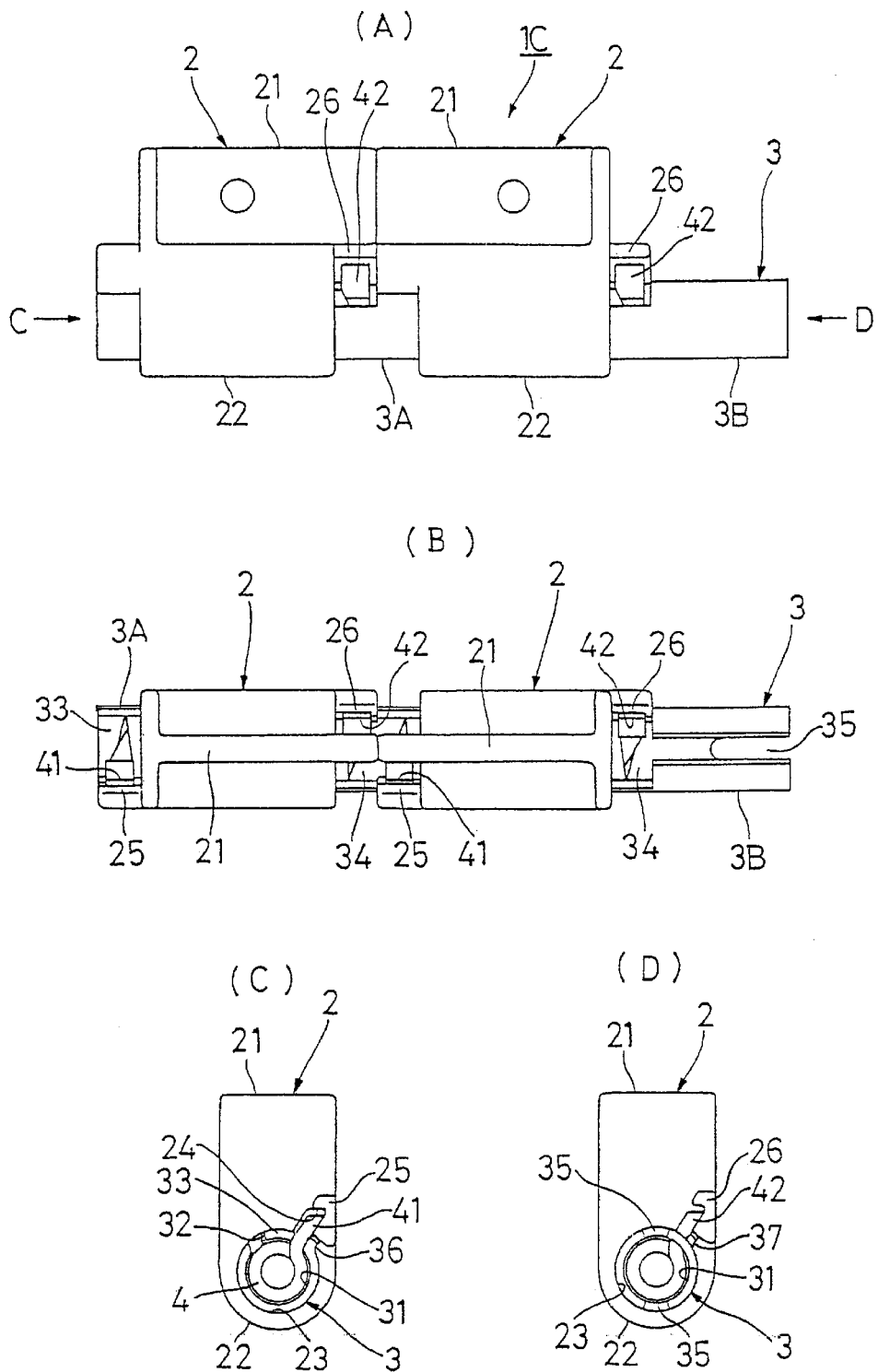
FIG. 12 is an illustration showing a fourth embodiment of the present invention.
Figure 13:
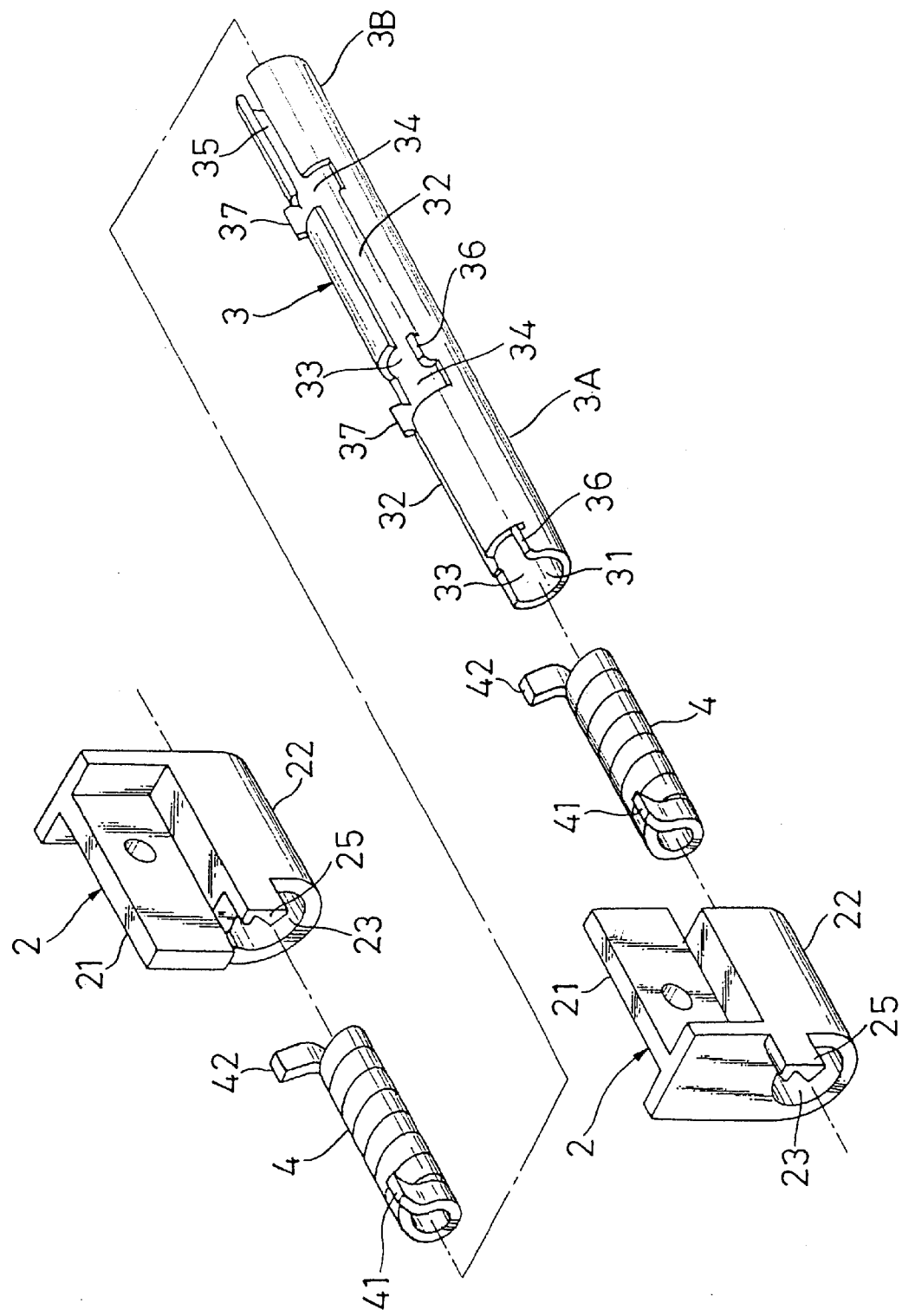
FIG. 13 is an exploded perspective view of the fourth embodiment.

FIGS. 12 and 13 show a fourth embodiment of the present invention. In a hinge assembly 1C of this embodiment, two each of the first hinge members 2 and the coiled springs 4 are used. The two first hinge members 2, 2 are fixed to the display C such that the axis of the support holes 23, 23 are aligned with the rotation axis L and they are generally contacted with each other in the direction of the rotation axis L. The two coiled springs 4, 4 are inserted in the receiving hole 31 of the second hinge member 3 such that the coiled springs 4, 4 are arranged in a row. The second hinge member 3 is formed with two sets of cutout parts 33, 34 which are arranged away from each other in the axial direction for the engagement portions 41, 42 of the two coiled springs 4, 4. Of course, each side facing the cutout parts 33, 34 is formed with the third and fourth engagement portions 36, 37. In this embodiment, since the two first hinge members 2, 2 are the two coiled springs 4, 4 are used, the frictional resistance and the biasing force against the display C can be increased. Accordingly, this embodiment is suited to be used for a notebook type personal computer having a large-sized display C.

Figure 14:
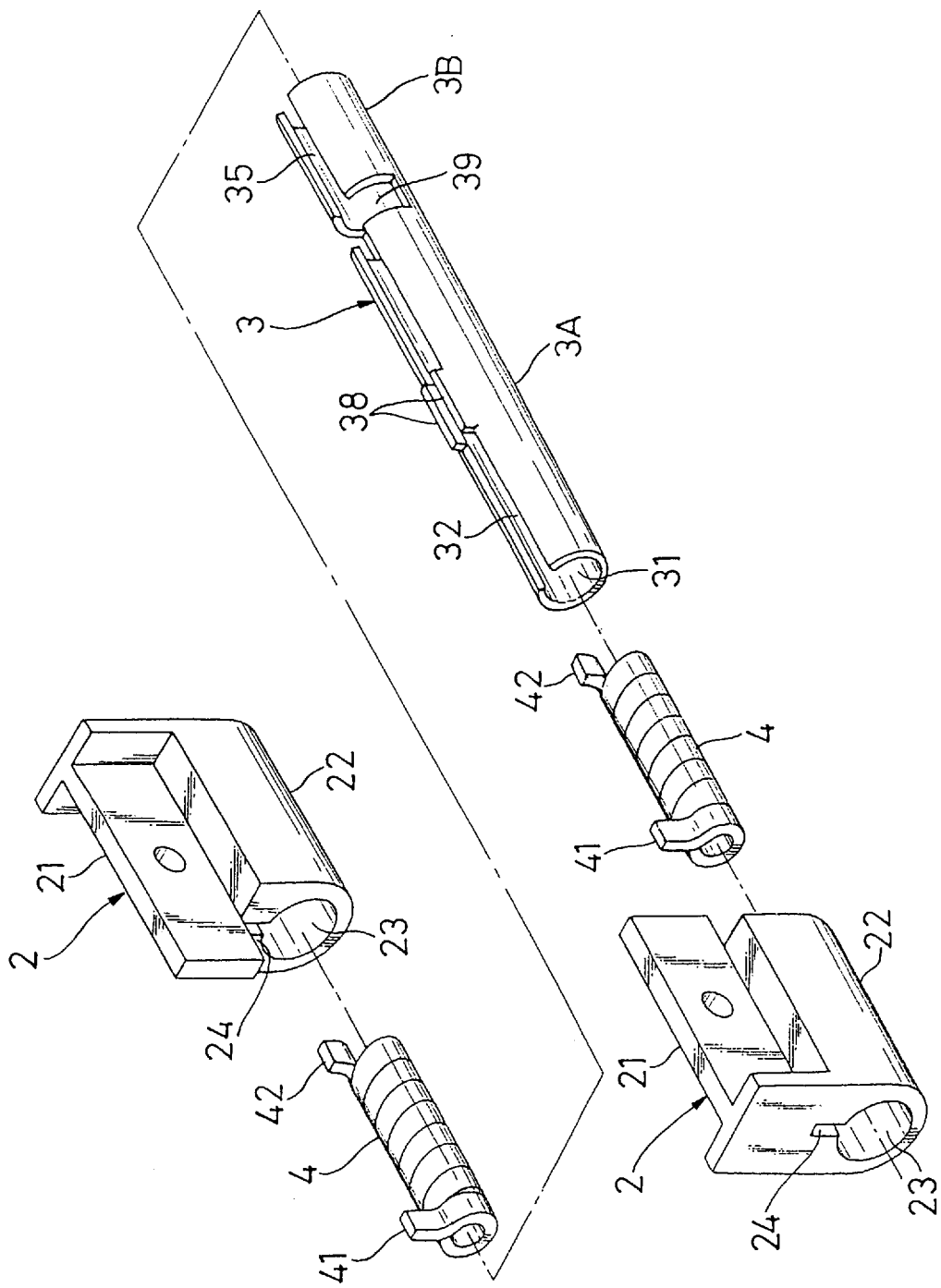
FIG. 14 is an exploded perspective view showing a fifth embodiment of the present invention.

FIG. 14 shows a fifth embodiment of the present invention. This embodiment is a modification of the embodiment shown in FIGS. 10 and 11. In this embodiment, two each of the first hinge members 2 and the coiled springs 4 of the embodiment shown in FIGS. 10 and 11 are used. The first hinge member 2 and the coiled spring 4 which are located on the side remote from the fixed part 3B are designed such that as in the hinge assembly 1A shown in FIGS. 10 and 11, but the abutment part 41 of the coiled spring 4 which is located nearer to the fixed part 3B is prevented from turning about the rotation axis L by one pair of projection pieces 38, 38, while the abutment part 42 is prevented from turning about the rotation axis L with respect to the first hinge member 2 by being inserted in the through-groove 24 of the other first hinge member 2. In order to allow the turning displacement of the abutment part 42 with respect to the second hinge member 3, a cutout part 39 having a length slightly longer by 180 degrees in the circumferential direction is formed in an end part of the shaft part 3A on the fixed part 3B side.

It should be noted that the present invention is not limited to the above embodiments but many changes can be made in accordance with necessity.

For example, in the above embodiments, although the second hinge member 3 is totally formed in a shaft-like configuration, it is also accepted that an attachment part like the attachment part 21 of the first hinge member 2 is formed on a part of the second hinge member 3, a shaft part is formed on the other part of the second hinge member 3, the attachment part is fixed to the keyboard B and the shaft part is inserted in the support hole 23. In that case, the shaft part is formed with a receiving hole extending on the axis from a front end face of the shaft part towards the inside and also with a split groove.

Moreover, in the above embodiments, it is constructed such that the first and fourth engagement portions 25, 37 are abutted with the abutment parts 41, 42, respectively, almost at the same time the display C begins to turn in the open direction from the upright position, and the second and third engagement portions 26, 36 are abutted with the abutment parts 42, 42, respectively, almost at the same time the display C begins to turn in the close direction from the upright position. However, it is also accepted that the first and fourth engagement parts 25, 37 are abutted with the abutment parts 42, 42, respectively, and the second and third engagement portions 26, 36 are abutted with the abutment parts 42, 42, respectively, after the display C is turned a predetermined angle in the open/close direction from the upright position. Owing to this arrangement, since the coiled spring 4 is twisted after the display C is turned a predetermined angle in the open/close direction, the coiled spring 4 is turningly biased towards the upright position side only after the display C is turned a predetermined angle.

Moreover, in the above embodiments, although it is set such that the relation (1) is normally established, it may also be set such that Fs−Fg>Ff is established in the area in the vicinity of the folded position, for example, in a range of about 10 degrees towards the upright position side from the folded position by properly selecting a spring constant value, etc. of the coiled spring 4. In that case, an engagement mechanism for removably engaging the display C in the folded position is preferably formed between the keyboard B and the display C. By doing so, it becomes possible not only that the display C can be engaged in the folded position by the engagement mechanism but also that the display C can automatically be turned about 10 degrees from the folded position by releasing the engagement mechanism. Thereafter, the display C can easily be turned in the open direction by hand. Even in the case where the relation (1) is normally established, it is accepted that biasing means is disposed between the keyboard B and the display C separately from the coiled spring 4 and the display C is turned about 10 degrees from the folded position by the biasing means.

INDUSTRIAL APPLICABILITY

A hinge assembly according to the present invention can be used for turnably connecting two articles such as a keyboard and a display of a notebook-type personal computer.

What is claimed is:

1. A hinge assembly comprising a first hinge member having a support hole, a second hinge member having a shaft part and turnably connected to said first hinge member by said shaft part being turnably inserted into said support hole, and biasing means disposed between said first hinge member and said second hinge member, said shaft part being press-filled into said support hole so that frictional resistance is generated between an outer peripheral surface of said shaft part and an inner peripheral surface of said support hole, the biasing means biasing said first and second hinge members towards a neutral position when said first and second hinge members are turned in normal and reverse directions from the neutral position;

a receiving hole being formed in said shaft part such that said receiving hole extends from a front end face of said shaft part towards the inside, and said biasing means is received in said receiving hole;

said biasing means being a coiled spring; and said first hinge member being formed with first and second engagement portions, and said second hinge member being formed with third and fourth engagement portions so that when said first and second hinge members are turned in one direction from the neutral position, said first and fourth engagement portions are engaged, respectively, with first and second end parts of said coiled spring to twist said coiled spring in accordance with turning motion of said first and second hinge members and said second and third engagement portions are brought away, respectively, from said second and first end parts of said coiled spring, and when said first and second hinge members are turned in the other direction from the neutral position, said first and fourth engagement portions are brought away, respectively, from said first and second end parts of said coiled spring and said second and third engagement portions are engaged, respectively, with said second and first end parts of said coiled spring to twist said coiled spring in accordance with turning motion of said first and second hinge members.

2. A hinge assembly in which a first of two articles is turnably connected with a lower end part of a second of the two articles about a generally horizontal rotation axis such that said second article can turn normally and reversely downward from an upright position where said second article is erected upward and downward, said hinge assembly comprising first and second hinge members fixed to said first and second articles, respectively, said first hinge member being formed with a support hole whose axis is aligned with the rotation axis and said second hinge member being formed with a shaft part which can turnably be inserted into said support hole, said shaft part being press-fitted into said support hole so that frictional resistance is generated between an outer peripheral surface of said shaft part and an inner peripheral surface of said support hole, biasing means being disposed between said first and second hinge members, said biasing means being adapted to bias said second article, which has been turned downward from the upright position, towards the upright position side through a hinge member fixed to said second article, a following relation being established among various turning forces acting on the second article, $$|Fs-Fg|<Ff$$

where Fg represents a force caused by a dead weight of said second article, Fs represents a force caused by a biasing force from said biasing means, and Ff represents a turning force corresponding to the frictional resistance, respectively;

a receiving hole being formed in said shaft part such that said receiving hole extends from a front end face of said shaft part towards the inside, and said biasing means being received in said receiving hole;

said biasing means being a coiled spring; and said first hinge member being formed with first and second engagement portions, and said second hinge member being formed with third and fourth engagement portions so that when said second article is turned in one direction from the upright position, said first and fourth engagement portions are engaged, respectively, with first and second end parts of said coiled spring to twist said coiled spring in accordance with turning motion of said second article and said second and third engagement portions are brought away, respectively, from said second and first end parts of said coiled spring, and when said second article is turned in the other direction from the upright position, said first and fourth engagement portions are brought away, respectively, from said first and second end parts of said coiled spring and said second and third engagement portions are engaged, respectively, with said second and first end parts of said coiled spring to twist said coiled spring in accordance with turning motion of said second article.

3. A hinge assembly comprising a pair of hinge members turnably connected together for turning in normal and reverse directions from a neutral position and a coiled spring for biasing said pair of hinge members, which have been turned in normal and reverse directions from the neutral position, towards the neutral position, a first hinge member of said pair of hinge members being formed with first and second engagement portions and a second hinge member being formed with third and fourth engagement portions so that when said pair of hinge members are turned in one direction from the neutral position, said first and fourth engagement portions are engaged, respectively, with first and second end parts of said coiled spring to twist said coiled spring in accordance with turning motion of said pair of hinge members and said second and third engagement portions are brought away, respectively, from said second and first end parts of said coiled spring, and when said pair of hinge members are turned in the other direction from the neutral position, said first and fourth engagement portions are brought away, respectively, from said first and second end parts of said coiled spring and said second and third engagement portions are engaged, respectively, with said second and first end parts of said coiled spring to twist said coiled spring in accordance with turning motion of said pair of hinge members.

4. A hinge assembly according to claim 3, wherein said coiled spring is twisted in a winding direction.

5. A hinge assembly according to claim 4, wherein said first hinge member is formed with a support hole extending on a rotation axis thereof, said second hinge member is formed with a shaft part turnably inserted into said support hole, said shaft part is formed with a receiving hole extending from a front end face of said shaft part towards the inside, and said coiled spring is received in said receiving hole.

6. A hinge assembly according to claim 3, wherein said first hinge member is formed with a support hole extending on a rotation axis thereof, said second hinge member is formed with a shaft part turnably inserted into said support hole, said shaft part is formed with a receiving hole extending from a front end face of said shaft part towards the inside, and said coiled spring is received in said receiving hole.

7. A hinge assembly according to claim 6, wherein said support hole is in the form of a through-hole whose opposite ends are open, said shaft part is inserted all the way through said support hole, opposite end parts of said coiled spring are projected outward from the opposite end parts of said support hole and also projected from an outer peripheral surface of said shaft part, said first and second engagement portions are formed on opposite end faces of said first hinge member which is formed with said support hole whose opposite end parts are open, and the opposite end parts of said shaft part projecting from said support hole is formed with said third and fourth engagement portions, respectively.

* * * * *

UNITED STATES PATENT AND TRADEMARK OFFICE
CERTIFICATE OF CORRECTION

PATENT NO. : 6,601,269 B2
DATED : August 5, 2003
INVENTOR(S) : Kazuyoshi Oshima and Kenji Tomizawa It is certified that error appears in the above-identified patent and that said Letters Patent is hereby corrected as shown below:

Column 11,
Lines 4 and 5, replace "press-filled" with -- press-fitted--

Signed and Sealed this

Twenty-third Day of September, 2003

JAMES E. ROGAN
*Director of the United States Patent and Trademark Office*